J. Cosolowsky,

Rat Trap.

No. 109,112.   Patented Nov. 8, 1870.

Witnesses
J. W. Hamilton Johnson
Chas. E. Upperman

John Cosolowsky, Inventor.
By his Attorneys,
Upperman & Johnson.

United States Patent Office.

JOHN COSOLOWSKY, OF TITUSVILLE, PENNSYLVANIA.

Letters Patent No. 109,112, dated November 8, 1870.

IMPROVEMENT IN ANIMAL-TRAPS.

The Schedule referred to in these Letters Patent and making part of the same.

*To all whom it may concern:*

Be it known that I, JOHN COSOLOWSKY, of Titusville, in the county of Crawford and State of Pennsylvania, have invented a new and useful Improvement in Animal-Traps; and I do hereby declare the following to be a full, clear, and exact description thereof, reference being had to the accompanying drawing of the same which makes part of this specification, and in which—

My improvement is designed to kill the animal by the descent of a dead-fall; and consists in the arrangement of a thin elastic board, tripped by the weight of the animal, in connection with a vertical slotted guide-bar, and a tripping-arm pivoted within said bar, so as to lock with an upper cross-bar of the frame when the dead-fall is set, and to pass into and be inclosed within said slot when the dead-fall descends.

In the accompanying drawing—

A represents a box, open at its top, and provided with two standards, B B, on opposite sides, connected at their upper ends by a cross-bar, C.

A dead-fall, D, is arranged between the standards, having recesses, *a*, within which said standards fit, so as to hold it in place.

Figure 1:
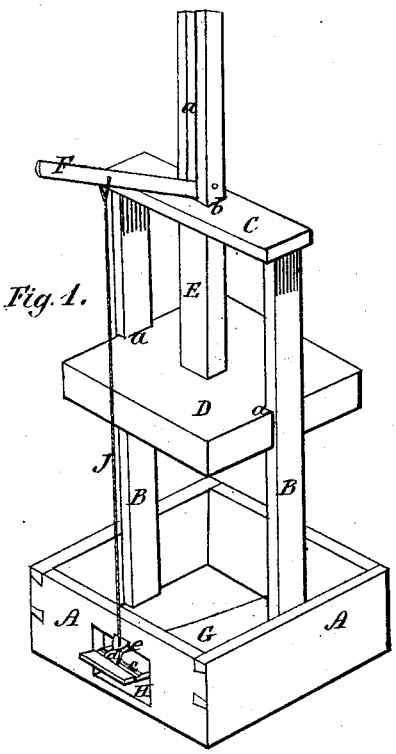
Figure 1 represents a view in perspective of a trap, set ready for use, embracing my improvements.
Figure 2:
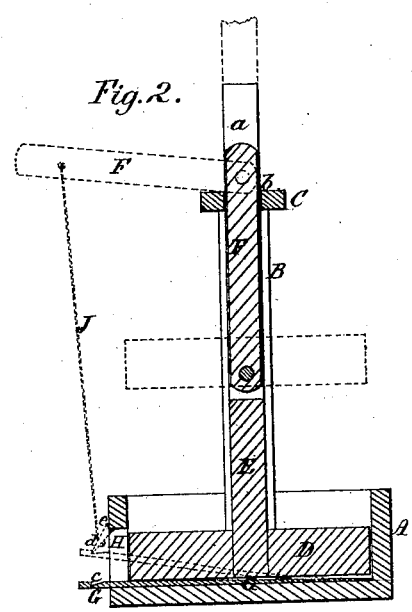
Figure 2 represents a vertical section, showing the dead-fall in the position when tripped upon the animal.

A vertical slotted bar, E, extends upward from the center of the dead-fall and passes through an opening, *b*, in the cross-bar C, for the several purposes of guiding the dead-fall in its vertical movement, and receiving a pivoted arm, F, in its slot *a*, so that, while it may be entirely closed therein to permit the bar to rise and fall, as shown in fig. 2, it also allows it to project, at right angles therefrom, over and upon the cross-bar C, as shown in fig. 1, to hold it up when set.

To the inside of the bottom of the box A a thin elastic board, G, is attached at one end, so that its other end is perfectly free. Its normal condition is to rest upon the bottom of the box, and when its free end is raised it must be against the resistance of its elasticity. This is one of the features of my improvement, and is for the purpose of effecting the tripping of the board by the slightest pressure thereon.

The free end of this elastic tripping-board extends through an opening, H, in the side of the box, and is provided with a transverse notch, *c*, on its upper side, into which the sharp edge of a small locking-piece, *d*, fits, having in its upper end a V-shaped notch, *e*, which is made to fit, when the trap is set against the upper edge of the opening H; and when so set, this locking-piece *d* maintains an inclined position with respect to the elastic board and the frame.

This locking-piece is connected by a cord, J, to the free end of the pivoted arm F of the central guide-bar, so that the least pressure by the animal upon the elastic board G will release the locking-piece *d* therefrom and from the box, and allow the dead-fall to drop and confine the rat within the box, so that, if not killed, it cannot escape.

The rat may enter at the opening H, beneath the elastic board, without tripping it, or over the sides of the box.

I am aware that a vertical falling-plate, provided with bars, so as to inclose, when tripped, the animal within a box, has been used, and that said plate has been set in position by means of a weighted pivoted arm, locked to the frame by an inclined tripping device, connected to the plate by cords and pulleys; but this device can only be released to trip the falling plate by the contact of the back of the animal against the under side of the weighted pivoted arm while burrowing in the earth.

Having described my invention,

I claim—

1. The thin elastic tripping-board G, arranged within and secured to the bottom of the box A, so that, when tripped, it will descend and lie flat upon said bottom, in the manner herein shown and described.

2. In combination with a thin elastic tripping-board the dead-fall D, the locking-piece *c*, the guide-bar E, and the pivoted tripping-arm F, arranged and operating as described.

JOHN COSOLOWSKY.

Witnesses:
FRED. BATES,
J. J. HOLDEN.